No. 790,390. PATENTED MAY 23, 1905.
E. F. PRICE.
PROCESS OF REDUCING METALLIC COMPOUNDS.
APPLICATION FILED AUG. 31, 1904.

Witnesses:
J. T. Walker.
J. B. Hill.

Inventor:
Edgar F. Price,
by Byrnes & Townsend,
Att'ys.

No. 790,390. Patented May 23, 1905.

UNITED STATES PATENT OFFICE.

EDGAR F. PRICE, OF NIAGARA FALLS, NEW YORK.

PROCESS OF REDUCING METALLIC COMPOUNDS.

SPECIFICATION forming part of Letters Patent No. 790,390, dated May 23, 1905.

Application filed August 31, 1904. Serial No. 222,890.

*To all whom it may concern:*

Be it known that I, EDGAR F. PRICE, a citizen of the United States, residing at Niagara Falls, in the county of Niagara and State of New York, have invented certain new and useful Improvements in Processes of Reducing Metallic Compounds, of which the following is a specification.

This invention relates to the reduction of refractory compounds, ores, or mixtures containing metals which are volatile at a temperature approximately that required to effect reduction and which remain liquid at a temperature below that of reduction—for example, silica and alumina.

It also relates to a method of collecting and removing the reduced metal or alloy.

It is impracticable to produce any considerable amount of silicon, aluminium, manganese, &c., by electrically heating a compound of the metal and carbon under the usual conditions, for the reason that the reduced metal readily volatilizes and is either driven out of the furnace into the air, where the metallic vapors oxidize, or combines with some of the carbon to produce a carbid. Furthermore, that portion of the metal which is not driven off is often scattered through the unreduced material in separate particles, which cannot be readily recovered.

According to this process the charge of the refractory metallic compound and reducing agent is electrically heated to the reduction temperature for a relatively short period, the maximum temperature of the charge being kept at a point which will substantially prevent volatilization of the reduced metal, and the metal is at once withdrawn from the region of maximum temperature, thereby substantially preventing its volatilization or combination with carbon. Considerable amounts of the previously-reduced metal or of an alloying metal are preferably introduced into the upper end of the furnace and caused to percolate down through the charge, thereby collecting the separate particles of metal and enabling the product to be withdrawn through a tap-hole.

Two forms of electric-arc furnaces which may be employed for carrying out the process are shown in the accompanying drawings, in which—

Figure 1:
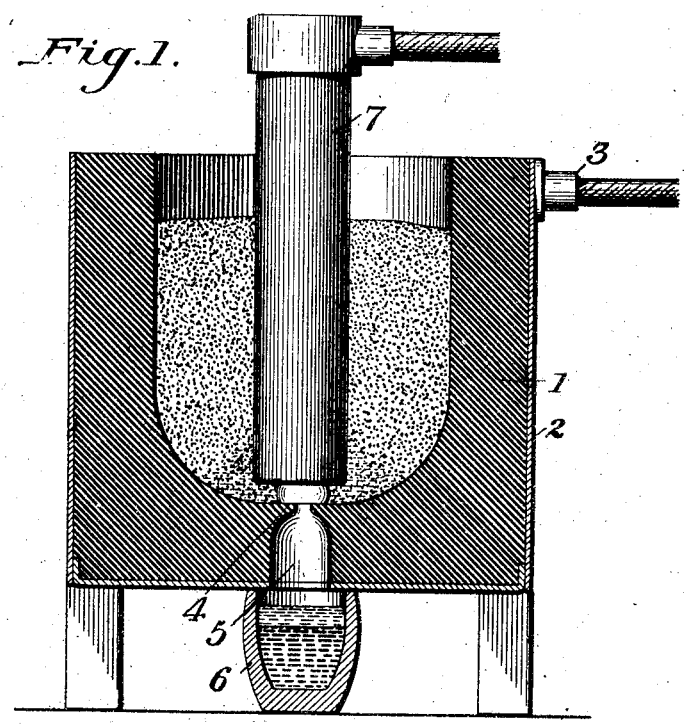
Figure 2:
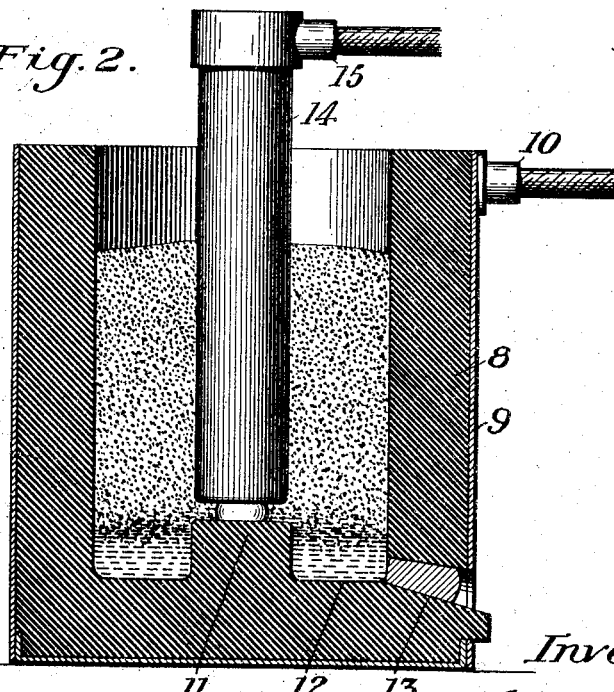

Figure 1 is a vertical axial section of a furnace having a central outlet for metal, and Fig. 2 is a vertical axial section of a furnace having an annular metal receptacle and a lateral tap-hole.

The furnace shown in Fig. 1 comprises a body 1 of solid carbon surrounded by a metal casing 2, having an electric terminal 3, by which it is constituted one electrode. A metal-outlet 4 opens centrally through the bottom of the furnace into a larger passage 5, by which the reduced metal is delivered into a vessel 6. A carbon cylinder 7, having a terminal, depends within the furnace to a point just above the outlet 4, whence an arc is sprung to the carbon body. In using this furnace to carry out the process the charge of the refractory compound and reducing agent—for example, silica and carbon—is fed into the furnace and around the depending electrode 7. An arc is then sprung from this electrode to the carbon body 1, effecting reduction. The reduced metal at once falls through the outlet 4 and passage 5 into the vessel 6. The voltage and density of the current are maintained within such limits that the reduced metal escapes from the furnace before it is volatilized. Molten metal or pieces of metal, either that to be reduced or an alloying metal, such as iron, may be introduced into the furnace with the charge and allowed to percolate down through it, collecting any scattered particles of reduced metal and carrying them down into the vessel below.

The furnace shown in Fig. 2 comprises a body 8 of solid carbon surrounded by a metal casing 9, having an electric terminal 10, by which it is constituted one electrode. A cylindrical projection 11 rises centrally from the base of the carbon body, leaving an annular metal-receptacle 12, from which leads a lateral tap-hole 13. The other electrode (a carbon cylinder 14, having a terminal 15) extends down within the furnace and into proximity to the projection 11, to which an arc is sprung. The operation of this furnace is similar to that of the furnace of Fig. 1, except that the reduced metal falls from the region of maximum temperature into the receptacle 12, where it may be allowed to collect and tapped off as desired.

The process and the furnaces shown may be employed to reduce refractory compounds or mixtures containing two or more metals—for example, manganiferous iron ores—for the production of ferromanganese.

I claim—

1. The process of reducing compounds of metals whose temperatures of reduction and volatilization are approximately the same, which consists in heating a charge of the compound and a reducing agent in an electric-arc furnace, keeping the maximum temperature of the charge at a point which will substantially prevent volatilization of the reduced metal, and removing the metal from the region of maximum temperature as it is reduced, as set forth.

2. The process of recovering metals from their ores, which consists in heating a charge of the compound and a reducing agent in an electric-arc furnace, and collecting the scattered particles of reduced metal by introducing a metal into the furnace and causing it to percolate downward through the charge, as set forth.

3. The process of recovering from their ores, metals whose temperatures of reduction and volatilization are approximately the same, which consists in heating a charge of the compound and a reducing agent in an electric-arc furnace, keeping the maximum temperature of the charge at a point which will substantially prevent volatilization of the reduced metal, removing the metal from the region of maximum temperature as it is reduced, and collecting the scattered particles of reduced metal by introducing a metal into the furnace and causing it to percolate downward through the charge, as set forth.

4. The process of recovering metals from their ores, which consists in heating a charge of the compound and a reducing agent in an electric-arc furnace, and collecting the scattered particles of reduced metal by introducing an alloying metal into the furnace and causing it to percolate downward through the charge, as set forth.

5. The process of recovering from their ores, metals whose temperatures of reduction and volatilization are approximately the same, which consists in heating a charge of the compound and a reducing agent in an electric-arc furnace, keeping the maximum temperature of the charge at a point which will substantially prevent volatilization of the reduced metal, removing the metal from the region of maximum temperature as it is reduced, and collecting the scattered particles of reduced metal by introducing an alloying metal into the furnace and causing it to percolate downward through the charge, as set forth.

6. The process of recovering metals from their ores, which consists in heating a charge of the compound and a reducing agent in an electric-arc furnace, and collecting the scattered particles of reduced metal by introducing iron into the furnace and causing it to percolate downward through the charge, as set forth.

7. The process of recovering from their ores, metals whose temperatures of reduction and volatilization are approximately the same, which consists in heating a charge of the compound and a reducing agent in an electric-arc furnace, keeping the maximum temperature of the charge at a point which will substantially prevent volatilization of the reduced metal, removing the metal from the region of maximum temperature as it is reduced, and collecting the scattered particles of reduced metal by introducing iron into the furnace and causing it to percolate downward through the charge, as set forth.

In testimony whereof I affix my signature in presence of two witnesses.

EDGAR F. PRICE.

Witnesses:
HARRY L. NOYES,
F. B. O'CONNOR.